United States Patent

[11] 3,629,652

[72] Inventors William Henry Maycock
Coventry;
Henry James Chafer, Rugby, both of England
[21] Appl. No. 828,225
[22] Filed May 27, 1969
[45] Patented Dec. 21, 1971
[73] Assignee Rotax Limited
London, England
[32] Priority June 10, 1968
[33] Great Britain
[31] 27,426/68

[54] IGNITION SYSTEMS
3 Claims, 2 Drawing Figs.
[52] U.S. Cl. .................................... 315/239,
315/209 R, 315/209 CD, 315/241
[51] Int. Cl. .................................... H01t 15/02
[50] Field of Search ......................... 315/175,
176, 209, 239, 240, 241, 209 CD

[56] References Cited
FOREIGN PATENTS
929,070 6/1963 Great Britain................ 315/239

Primary Examiner—Raymond F. Hossfeld
Attorney—Holman & Stern

ABSTRACT: The invention relates to an ignition system for supplying energy to a spark device. The system includes a first capacitor which can be charged from a source of DC supply, a device which breaks down when the voltage across the capacitor attains a predetermined value thereby to allow the capacitor to discharge through the spark device and a further capacitor which is connected in parallel with the capacitor and which can be charged from a separate source of supply when a higher energy is required, there being provided a unidirectional current flow device in series with the two capacitors.

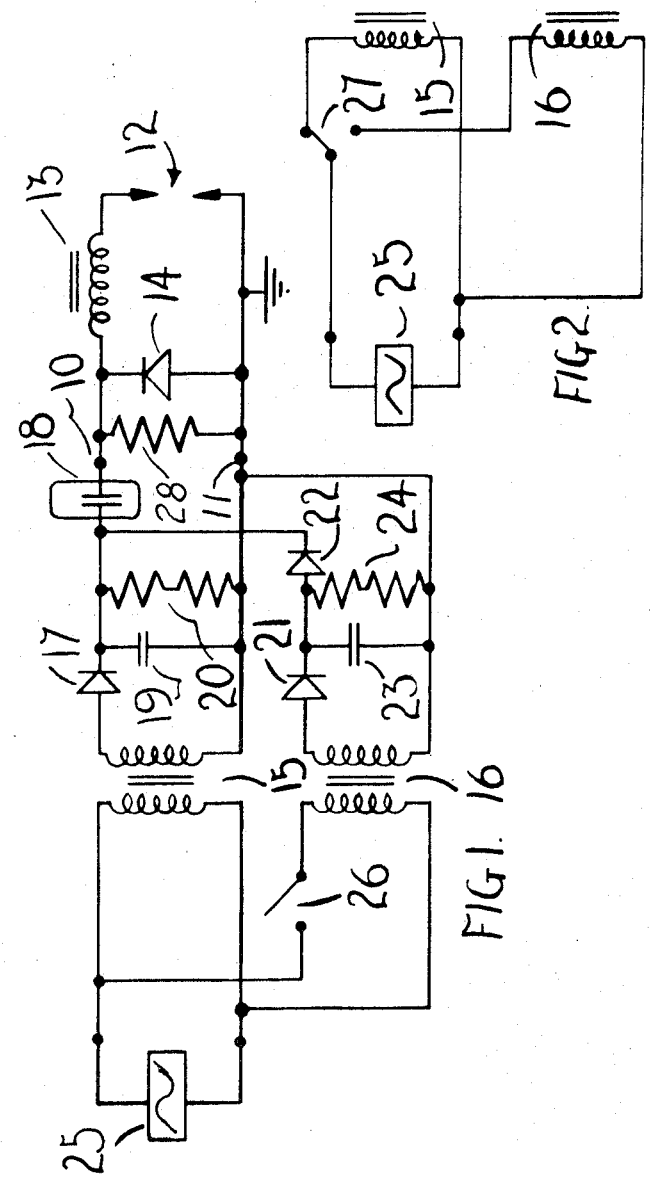

IGNITION SYSTEMS

THis invention relates to ignition systems and of the kind comprising a capacitor, means for charging the capacitor and a device connected in series with a pair of output terminals and said capacitor said device being arranged to break down and conduct when the voltage across the capacitor attains a predetermined value thereby to allow the capacitor to discharge through a spark device connected across said terminals.

A system of the kind specified can be used to supply the ignitor plug of a gas turbine engine however, the energy available from the system is determined by the capacity of the capacitor and the voltage at which the device breaks down, neither of which can easily be changed when the energy requirement alters.

The object of the invention is to provide in a simple and convenient form, such a system in which the energy available can be altered.

According to the invention a system of the kind specified includes a further capacitor connected in parallel with said capacitor, a unidirectional current flow device connected in series with said further capacitor and said capacitor and arranged to prevent current flow from said capacitor into said further capacitor, and means whereby the further capacitor can be charged when an increase in the energy supplied by the system is required.

In the accompanying drawings:

FIG. 1 is a circuit diagram of one example of an ignition system in accordance with the invention, and FIG. 2 shows a modification of the circuit of FIG. 1.

As shown in FIG. 1 the system includes a pair of output terminals 10 and 11 which are connected in use, to an ignitor plug 12 of a gas turbine engine. The ignitor plug 12 is provided with a special supply circuit which includes an inductor 13 connected in series with the ignitor and the terminals 10 and 11 and across said terminals is a diode rectifier 14 having its anode connected to terminal 11. Moreover, in parallel with the diode 14 is a resistor 28.

Terminal 11 is connected to one end of each of the secondary windings of a pair of transformers 15 and 16 and the other end of the secondary winding of transformer 15 is connected by way of a diode rectifier 17 and a barrier spark gap 18 arranged in series with the terminal 10. The diode rectifier 17 has its anode connected to the secondary winding. Moreover, connected between terminal 11 and a point intermediate the diode rectifier 17 and the barrier spark gap 18 is a first capacitor 19 and in parallel with this capacitor is a bleed resistor 20.

The other end of the secondary winding of transformer 16 is connected by way of diode rectifiers 21 and 22, to a point intermediate the diode rectifier 17 and the barrier spark gap 18. A point intermediate the diode rectifiers 21 and 22 is connected to one plate of a further capacitor 23 and the other plate of which is connected to the terminal 11. Furthermore, in parallel with the capacitor 23 is a bleed resistor 24.

The primary winding of the transformer 15 is connectable to a source of AC supply 25 and the primary winding of the transformer 16 is connectable to the same source of supply by way of switch 26.

In use, with the switch 26 opened and with the supply 25 connected capacitor 19 charges by way of the diode rectifier 17 until a point is reached at which the barrier spark gap 18 breaks down. When this occurs the capacitor 19 is discharged through the ignitor plug 12 and the amount of energy depends upon the capacity of the capacitor 19 and the voltage at which the breakdown down occurs. The resistor 28 acts to maintain the plate of the spark gap which is connected to the terminal 10, at earth potential until breakdown of the spark gap occurs.

When it is required to increase the energy supplied to the ignitor the switch 26 is closed and while capacitor 19 is being charged by way of diode rectifier 17 capacitor 23 is charged by way of diode rectifier 21. When the voltage across the capacitor 19 is sufficient to cause breakdown of the barrier gap 18 both capacitors discharge through the ignitor, the capacitor 23 being effectively placed in parallel with the capacitor 19 by way of the diode rectifier 22. It is desirable that the voltages developed across the secondary windings should be equal however, this is not essential since for instance if the voltage developed across the secondary windings of transformer 16 is slightly less than that developed across the secondary winding of transformer 15 both capacitors will discharge through the ignitor at the same time. In the event that the voltage developed across the secondary winding of the transformer 16 is higher than that which is developed across the secondary winding of the transformer 15 then during the charging process current will flow through the diode rectifier 22 and will act to charge the capacitor 19. By this arrangement the barrier gap 18 is only responsive to the voltage developed across the capacitor 19, and therefore the spark rate remains substantially constant whether the switch 26 is open or closed.

In the modification shown in FIG. 2 a selector switch 27 is provided and the switch 26 is omitted. The selector switch when in the position shown allows transformer 15 only to be energized and consequently only capacitor 19 is charged. This therefore provides the lower level of energy. When the selector switch is in the alternative position only transformer 16 will be energized and this transformer will charge both capacitors 19, 23. This therefore provides the higher energy level. The selector switch may also have an off position (not shown) for use when the system is not required.

It will be appreciated that the capacitors may be charged from a DC source should this prove more convenient and that in the examples described the diode rectifiers 17 and 21 may be bridge connected rectifier units.

Having thus described our invention what we claim as new and desire to secure by Letters Patent is:

1. An ignition system of the kind comprising a first capacitor, means for charging the capacitor, a spark gap connected in series with a pair of output terminals and said capacitor, said spark gap being arranged to break down and conduct when the voltage across the capacitor attains a predetermined value thereby to allow the capacitor to discharge through a spark device connected across said terminals, the system also including a second capacitor connected in parallel with said first capacitor, a diode rectifier means connected in series with said capacitors for preventing current flow from said first capacitor into said second capacitor, and means for charging the second capacitor when an increase in the energy supplied by the system is required.

2. An ignition system as claimed in claim 1 in which the means for charging the capacitors comprises a pair of transformers respectively, each transformer having associated therewith a rectifier and the transformer which charges the second capacitor has switch means associated therewith whereby it can be brought into operation only when an increase in the energy supplied by the system is required.

3. An ignition system as claimed in claim 1 in which the means for charging the capacitors comprises a pair of transformer means coupled respectively thereto, each transformer means having associated therewith a rectifier, and a selector switch means for energizing one or the other transformer means, said one transformer means serving to charge said first capacitor and said other transformer means serving to charge the second capacitor and the first capacitor through said diode rectifier means.

* * * * *